United States Patent Office 2,849,330
Patented Aug. 26, 1958

2,849,330

CELLULOSE DERIVATIVES

Henry A. Hoffman, Jr., and William K. Wilkinson, Waynesboro, Va., assignors to E. I. du Pont de Nemours and Company, Wilmington, Del., a corporation of Delaware No Drawing. Application June 1, 1955
Serial No. 512,567

28 Claims. (Cl. 106—169)

This invention relates to derivatives of cellulose and articles composed thereof having modified dyeing characteristics.

Techniques of forming articles from cellulose esters and the like are well known, especially the procedure of dissolving a cellulose derivative in an organic solvent, extruding the resulting solution through an aperture of suitable shape and size, and removing the solvent to leave a solid shaped article. Of considerable commercial importance are such articles having at least one dimension of a different order of magnitude from at least one other dimension, such as filaments (length much greater than any transverse dimension) and films (thickness only a small fraction of both width and breadth). The appearance of such an article can be enhanced by dyeing, as is highly desirable for textile materials, but conventional dyeing results in a product notorious for fugitivity of color upon exposure to foreseeable conditions of fumes, light, washing, and ironing.

A primary object of the present invention is fast coloration of articles composed of predominantly organic derivatives of cellulose. Another object is modification of compositions of cellulose derivatives to include sites for reception of basic dyes. A further object is production of filaments and films of cellulose derivatives having improved affinity for basic dyes without impairment of physical properties thereof. Other objects, together with means and methods for attaining the various objects, will be apparent from the following description of the invention.

In general, the objects of the present invention are accomplished by incorporating in an organic cellulose derivative soluble in an organic solvent a minor amount of a polymeric substance also soluble in such solvent and containing as part of the polymer structure sulfonic acid groups available for reaction with basic dyestuffs. This invention comprehends particularly articles of which the major component is an ester or an ether of cellulose soluble in an organic solvent and a minor component is an ester or an ether of cellulose soluble in the same organic solvent and containing attached sulfonic acid groups receptive to basic dyestuffs.

To qualify as available or receptive to basic dyestuffs, a sulfonic acid group may be either a dangling —SO$_3$H group, where the valence bond indicates attachment to the minor polymeric component substance, or a hydrolyzable salt thereof in which hydrogen is replaced by a convenient neutralizing cation, such as alkali metal, alkaline-earth metal, or ammonium or organic-substituted ammonium ion. The polymeric substance carrying the sulfonic acid group may be either cellulosic or non-cellulosic and may be formed by either addition or condensation. The sulfonic acid groups may be present in a monomeric predecessor of the modifying polymer or may be added or substituted onto the polymer itself. For optimum effect upon physical properties of articles made of the stated compositions the molecules of modifying polymer should be comparable in size to those of the cellulose derivative being modified, although polymers with molecular weights of as low an order as thousands can prove useful according to this invention; a practical upper limit of molecular weight on the order of hundreds of thousands is imposed upon both major and minor components by increasing difficulty of solubility.

The invention is exemplified below in some detail with cellulose acetates as the major component of each of the modified compositions, especially cellulose triacetate and acetone-soluble cellulose acetate, because of their recognized commercial importance; however, examples of other cellulose derivatives suitable as the major component will come readily to mind, as will appropriate solvents for them. Included are simple esters of cellulose, such as benzoate, formate, propionate, butyrate, isobutyrate, acrylate, and crotonate; mixed esters, such as cellulose acetate propionate, acetate butyrate, and acetate nitrate, as well as other combinations of the simple ester groups; ethers, such as benzyl, ethyl, propyl, hydroxyethyl, and cyanoethyl celluloses; and mixed ether esters, such as ethyl cellulose acetate, for example.

In the following examples and elsewhere herein the term "triacetate" means that the average acetyl content of the cellulose is within the range of 2.7 to 3.0 (the theoretical maximum) acetyl groups per glucose unit, and "secondary," as applied to cellulose acetate, signifies reduced acetyl content, usually within the range of 2.0 to 2.6 acetyl groups per glucose unit of the cellulose, cellulose acetate in the upper part of that range being considered herein as soluble in acetone. In the absence of indication to the contrary, parts and percentages are given by weight.

Example I

One thousand parts water, 60 parts methyl acrylate (MA), and 40 parts sodium methallyl sulfonate (SMS) are dissolved in a suitable reaction vessel (equipped with a stirrer and reflux condenser). The mixture is heated to boiling, with stirring. One part potassium persulfate and 1.7 parts sodium bisulfite are added to the heated solution. A milky polymeric (SMS/MA) suspension begins to form immediately and is stirred for an additional three hours until the refluxing temperature is 200° F. This suspension is evaporated in a steam-heated chamber for about 36 hours. The resulting clear, gummy polymer (105 parts) is cut into small pieces and washed with 400 parts water for one-half hour, with frequent stirring. The wash water is decanted and discarded, an additional 200 parts water added, and the polymer washed for 15 minutes. This second washing is then decanted. The polymer is redried to give about 45 parts polymer, containing 20.29% sodium methallyl sulfonate by analysis.

Forty parts of the above polymer are dissolved in 318 parts methylene chloride/methanol (90/10). This solution is added to a second solution of 960 parts cellulose triacetate in 3,840 parts methylene chloride/methanol (90/10). Then by conventional dry spinning operations, this dope is spun to 150-denier, 36-filament yarn, which contains about 37 milliequivalents (m. e. q.) of —SO$_3$H/kg. of yarn. Upon exposure for approximately 75 minutes to a dye bath containing an excess of a basic violet dye of Colour Index (CI 681), the yarn takes up about 0.04% of the dye at a pH of 4.5. A control sample of yarn prepared without addition of the SMS/MA modifier failed to take up appreciable dye upon similar exposure to the dyebath, and what little color appeared was removed easily by washing the yarn.

Another sample of yarn prepared as above was dyed with a basic green dye (CI 657) to deep shades in 1½ hours in 2% aqueous baths at the boil. The green color on this yarn faded after 20 Fade-Ometer hours, passed 5 fumefade cycles, passed the No. 3 AATCC (Am. Assoc. of Textile Chemists and Colorists) wash test, and did not sublime when exposed to 420° F. dry heat for one minute.

Example II

An amount of 35.5 parts SMS/MA copolymer containing 19.0% SMS is dissolved in 278 parts 9:1 methylene chloride/methanol, and this solution is added to a solution of 616 parts cellulose triacetate in 2,562 parts methylene chloride/methanol; a 75-denier, 18-filament yarn prepared from this composition contains approximately 56 m. eq. sulfonate groups per kg. of yarn and takes up 0.20% basic violet dye (CI 681) in approximately 2½ hours from a dye bath containing an excess of this dye at pH of 4.5.

Other samples of this yarn also dyed with other basic dyes, and these dyeings exhibited increased fastness properties. Thus, yarn successfully dyed with basic green (CI 657) to a deep shade in one hour in 3% aqueous bath at 80° C. The green color on this yarn faded after 20 Fade-Ometer hours, passed 5 fumefade cycles, and passed the No. 3 AATCC wash test.

Example III

A copolymer of sodium methallyl sulfonate and methyl acrylate (53 parts), prepared according to the method given in Example I and containing 20% sodium methallyl sulfonate, is dissolved in a solvent containing 180 parts acetone and 20 parts water. The resulting polymer solution is added to 4,000 parts cellulose acetate spinning solution containing approximately 1,000 parts secondary cellulose acetate, 120 parts water, and 2,880 parts acetone. After stirring, this solution is spun into 75-denier, 24-filament yarn in the conventional manner. The resulting yarn contains 51 m. eq. sulfonate per kilogram of yarn and takes up 1.40% basic violet dye (CI 681) in 49 minutes from a boiling solution containing an excess of the dye at pH 4.5 to a fast color.

Fabric made of another sample of yarn consisting of these fibers readily absorbed basic green dye (CI 657) from a 3% aqueous bath in 1½ hours at 160° F.; this dyeing faded appreciably after 20 Fade-Ometer hours, passed 5 fumefade cycles, and passed the No. 2 AATCC wash test.

Example IV

When 2.66% of the polymer prepared as indicated in Example I and containing 18.7% of SMS is spun to a 75-denier, 24-filament cellulose acetate yarn, the sulfonate content of the yarn amounts to approximately 23 m. eq./kg. By absorbing 0.6 gram basic violet dye (CI 681) in one hour from a boiling dye bath containing an excess of the dye, this yarn takes on a fast violet color. When another sample of yarn prepared as in this example was dyed with a basic green dye (CI 657), the dyed fiber faded after 40 Fade1Ometer hours, passed 5 fumefade cycles, and passed the No. 2 AATCC wash test.

Example V

Five parts methyl acrylate and 5 parts potassium styrenesulfonate are dissolved in 100 parts water. With this solution heated to reflux, a tenth part potassium persulfate and 0.17 part sodium bisulfite are added. The mixture is refluxed with stirring for three hours and 15 minutes, when the temperature at the head of the reflux condenser becomes greater than 90° C.; the polymer solution is poured into a flat pan and allowed to evaporate in a heated chamber. The yield of dry, rubbery polymer is 9.6 parts. The polymer is dissolved in a mixture of 75 parts acetone and 25 parts water. Twenty grams of a solution containing five grams secondary cellulose acetate and 15 grams acetone are diluted with 8 grams of the acetone solution containing 0.1 gram of the above polymer. The solution is cast into films that, when dyed with a basic violet dye (CI 681), take up a large amount of the dye from a boiling dye bath containing an excess of the dye. Control cellulose acetate films lacking the sulfonic modifier were not appreciably dyed with the same dye in an equivalent time.

Example VI

Forty parts of a copolymer of sodium allyl sulfonate and vinyl acetate (12/88) and 630 parts cellulose triacetate are dissolved in 3,350 parts of a mixture of methylene chloride and methanol (90/10) to form a viscous spinning dope. This dope is spun by conventional methods into 75-denier, 18-filament yarn, containing about 50 milliequivalet $-SO_3H$ per kilogram. This yarn takes up about 0.13 g. violet dye (CI 681) when dyed in a boiling dye bath containing an excess of the dye at pH 4.5, resulting in a fast color. Other basic dyes give deep dyeing of similar increased fastness properties.

Example VII

One part triethylammonium cellulose acetate sulfopropionate, having about 0.2 sulfopropionate group per glucose unit, is prepared conventionally by reaction of the inner anhydride of sulfopropionic acid on a cellulose acetate containing about 2½ acetyl groups per glucose unit. This material and 9 parts cellulose triacetate are dissolved in methylene chloride/methanol (90/10) to form a viscous spinning dope. Fibers are spun from this dope by conventional methods; these fibers, as well as yarns and fabrics made from them, readily absorb basic dyes from aqueous baths at the boil, although those made from unmodified cellulose triacetate do not dye under like conditions.

In particular, yarn made from fibers spun from this dope readily dyed with basic violet (CI 681) and basic green (CI 657) dyes to deep shades in 1½ hours in 2% aqueous baths at the boil. The green yarn faded after 26 Fade-Ometer hours, passed 5 fumefade cycles, passed the No. 3 AATCC wash test, and showed no evidence of sublimation when exposed to 420° F. dry heat for one minute.

Example VIII

One part triethylammonium cellulose acetate sulfopropionate, having 0.2 sulfopropionate group per glucose unit, perpared as described in Example VII, is dissolved in 4 parts 95% acetone (5% water) and mixed with an acetone solution of 19 parts secondary cellulose acetate. The resulting dope is spun by conventional methods into fibers. These fibers readily dye with basic violet (CI 681) and basic green (CI 657) to deep shades in one hour in 3% aqueous baths at 80° C. The green color resulting from the second of these two dyeings fades after 20 Fade-Ometer hours; the dyed fibers pass 5 fumefade cycles, and pass the No. 2 AATCC wash test.

Example IX

Seven parts sulfoethyl cellulose acetate, prepared by acetylation of sulfoethyl cellulose having 0.25 sulfoethyl group per glucose unit by conventional methods, and 93 parts cellulose triacetate are dissolved together in methylene chloride/methanol (90/10) to form a viscous spinning dope. The resulting dope is spun into fibers by conventional methods. Yarns of these fibers readily absorb basic violet (CI 681) and green (CI 657) dyes from 3% aqueous baths in 1½ hours at the boil, the dyed products exhibiting superior fastness properties.

Example X

Thirty-four grams sulfoethyl cellulose containing 0.25 sulfoethyl group per glucose unit, 566 g. cotton linters and 2,600 g. acetic acid are mixed together for 30 minutes at 32° C. at which time 1,000 g. acetic acid and 10 g. sulfuric acid are added; mixing is continued for 15 minutes, during which time the mixture is cooled to 23° C. Then 490 g. acetic anhydride is added, and during 30 minutes of further mixing the temperature rises to 35° C. Then 1,000 g. more acetic anhydride is added, and mixing continues with application of heat until a clear viscous gum is obtained. Subsequently 1,600 cc. 90% acetic acid is added. The product is then precipitated and is washed and dried. The resulting flake is dissolved in methylene chloride/methanol (90/10) and the dope so formed is spun conventionally into fibers. One sample of these fibers is dyed with basic violet (CI 681) and another with basic green (CI 657) in 3% aqueous baths in 1½ hours at the boil. Both dyed products exhibit bright clear colors of superior fastness properties.

*Example XI*

A spinning dope is formed as in Example X, except that after the clear viscous gum is obtained, an acetone-soluble product is obtained by partial saponification of the triacetate by conventional methods; from it, after precipitation, washing, drying, and dissolving in acetone, fibers are spun by the conventional dry-spinning process. These fibers readily dye with basic dyes to colors of excellent fastness.

*Example XII*

One part sulfonated cellulose acetate crotonate containing 0.20 sulfonate group per glucose unit is prepared by the treatment of cellulose acetate crotonate with sodium bisulfite as described by Dreyfus in Patent 2,321,069. This is dissolved, together with 9 parts cellulose triacetate, in methylene chloride/methanol (90/10) to form a viscous spinning dope. This dope is spun by conventional methods into fibers. These fibers readily absorb basic dyes from an aqueous bath at the boil to give clear fast colors.

The above examples indicate to some extent the increased fastness of color imparted by basic dyes to articles formed from the compositions of this invention; additional evidence of the desirability of practicing this invention upon diverse filaments and films accrues with increase in intensity or time of testing. In addition to the exemplified basic dye-stuffs, there are many other suitable ones, including those with the following Colour Index numbers: 21 (yellow), 658 (blue), 662 (green), 663 (blue), 677 (magenta), and 749 (red). Also well suited to this purpose are various quaternary anthraquinonyl aminoalkylammonium salts, such as those mentioned by Tatum in Patent 2,153,012. A prominent group of basic dyestuffs adapted to this use is known in the trade by the designation "Sevron."

Besides the non-cellulosic modifying polymers exemplified above, also suitable for this purpose are the following copolymers: sodium methallyl sulfonate/methyl methacrylate, sodium methallyl sulfonate/acrylamide, potassium allyl sulfonate/methoxymethyl methacrylate, sodium styrenesulfonate/isopropyl acrylate, trimethylamino alpha-methyl styrenesulfonate/ethylacrylate, to name but a few monomer combinations and representative salt forms. Polyamides and polyesters containing the essential available sulfonic acid group may be used likewise: for example, reaction products of a sulfonated acid chloride (say, sulfonated isophthaloyl chloride) with a diamine (say, dimethyl piperazine) or with a dialcohol (say, diphenylol propane).

Suitable cellulosic modifying components include the sulfoesters, as indicated above, of which additional representative groups are sulfoacetate, sulfobutyrate, sulfoisobutyrate, sulfoisovalerate, sulfohexahydrobenzoate, sulfolaurate, sulfonicinoleate, and sulfophthalate. The type of sulfonic acid derivative described by Dreyfus in Patent 2,321,069 is an effective modifier for the purpose of this invention, being formed by addition of a bisulfite to unsaturated cellulose derivatives such as the following: cellulose cinnamate, crotonate, maleate, linoleate, oleate, ricinoleate, and undecylinate. Among suitable cellulose ether groups not exemplified above but also utilizable in a modifying minor component are sulfopropyl, sulfobutyl, sulfoisobutyl, sulfobenzyl, and sulfoethoxyethyl. Of course, both an ester group and an ether group may be present in a modifying cellulose derivative; presence of an unsulfonated ester group usually aids solubility of a sulfoether of cellulose in an organic solvent.

In general, at any given level of solubility, larger content of available sulfonic acid can be tolerated in cellulosic substances as modifiers than in non-cellulosics, the cellulosic modifiers being almost invariably more compatible with the recipient major component, which itself is necessarily cellulosic; at low levels of compatibility, delustering and strength loss, as well as poor dyeing and other usually undesirable effects, are common, and for this reason the cellulosic type of modifiers containing sulfonic acid groups is preferable in the practice of this invention. Of course, the concentration of sulfonic acid groups in the modifier, whether cellulosic or not, is an important factor in both the degree of compatibility with the major component and the extent of solubility in the organic solvent—as is the concentration of the modifier in the modified composition. In non-cellulosic modifiers the available sulfonic acid, calculated as percent —$SO_3H$ by weight, ordinarily should not exceed about 10 or 12%, several percent often being adequate; in cellulosic modifiers, as much as one sulfonic acid group per glucose unit may be present when solubility of the modifier is adequate, as may be fostered by presence of alkyl side chains, for example, with the amount usually equalling at least 0.05 sulfonic acid group per glucose unit.

Accordingly, a useful measure of modification is the value of milliequivalents of available sulfonic acid groups per kilogram of the final article; such a milliequivalent amounts to 0.032 gram of sulfur. This content may be determined by the well-known Parr bomb analysis (described by Niederl at pp. 188–197 of "Micromethods of Quantitative Organic Analyses," Wiley, 2d ed.; and by Elek and Hill, J. Am. Chem. Soc. 55, 3479). Assuming that these base-receptive groups are distributed uniformly throughout the article, one also obtains from this value an index of dyeability with basic dyestuffs. Dyeability is usually insufficient at values of modification below ten milliequivalents per kilogram, appreciable (often adequate) between there and a hundred, and more than sufficient at several hundreds of milliequivalents per kilogram of article weight.

Articles composed according to this invention retain basic dye colors much better than articles of unmodified cellulose derivatives dyed with the usual dispersed dyestuffs or even cellulose derivatives modified as is known in the art and dyed with direct or acid dyestuffs, the latter modifications also being comparatively expensive and deleterious to physical properties in the filament, film, or similar article. Where processing of a material involves high-temperature treatment, as in heat-setting of a textile composed of highly acylated cellulose derivative, the present invention provides the additional advantage of superior resistance to sublimation of dye from the heated product. Furthermore, treatment according to this invention does not interfere with dyeability of the treated articles with dyes customarily used for cellulose derivatives. Other benefits inherent in the invention will become apparent to those undertaking to practice it.

The claimed invention:

1. A composition comprising, as the major component, a cellulose derivative soluble in an organic solvent and, as a minor component, an organic polymeric substance also soluble in such solvent and containing as part of the polymer structure at least 0.32 grams of sulfur, in the form of sulfonic acid groups available for reaction with basic dyestuffs, per kilogram of the total composition.

2. The composition of claim 1 in which the minor component has about the same molecular weight as the major component.

3. The composition of claim 1 in which the minor component is a linear polymer.

4. The composition of claim 1 in which the major component is from the class consisting of esters and ethers of cellulose.

5. The composition of claim 4 in which the major component is an acetate of cellulose.

6. The composition of claim 5 in which the major component contains an average of at least two acetyl groups per glucose unit of the cellulose.

7. The composition of claim 6 in which the major component is acetone-soluble.

8. The composition of claim 6 in which the major component is cellulose triacetate.

9. The composition of claim 1 in which the minor component is an addition polymer.

10. The composition of claim 9 in which the minor component is a polymer of a sulfonated monomer.

11. The composition of claim 9 in which the minor component is a copolymer of methallyl sulfonate in salt form and another copolymerizable monomer.

12. The composition of claim 11 in which the sulfonate content amounts to at most about 2% sulfonate by weight, calculated as $-SO_3H$, of the minor component.

13. The composition of claim 12 in which the minor component is a copolymer of sodium methallyl sulfonate and methyl acrylate.

14. The composition of claim 13 in which the major component is a cellulose acetate.

15. The composition of claim 14 in which the minor component is from the class consisting of esters and ethers of cellulose containing at least 0.32 gram of sulfur, in the form of sulfonic acid groups available for reaction with basic dyestuffs, per kilogram of the total composition.

16. The composition of claim 15 in which the minor component is a cellulose ester.

17. The composition of claim 16 in which the minor component is a cellulose acetate sulfonate.

18. The composition of claim 16 in which the ester is cellulose acetate sulfopropionate.

19. The composition of claim 18 in which the major component is an acetate of cellulose.

20. The composition of claim 15 in which the minor component is an ether ester of cellulose.

21. The composition of claim 20 in which the minor component is an ether acetate of cellulose.

22. The composition of claim 21 in which the major component is a cellulose acetate.

23. The composition of claim 22 in which the minor component is sulfoethyl cellulose acetate.

24. The composition of claim 22 in which the minor component is sulfoethyl cellulose acetate.

25. An article of manufacture produced from a uniform composition in which the major component is a cellulose derivative from the class consisting of esters and ethers of cellulose soluble in an organic solvent and a minor component is a polymeric substance soluble in the same solvent and containing sulfonic acid groups receptive to basic dyestuffs.

26. An article of manufacture produced from a uniform composition in which both the major component and the minor component are cellulose derivatives selected from the class consisting of esters and ethers of cellulose and the minor component is distributed uniformly throughout the major component, the minor component containing at least 0.32 gram of sulfur, in the form of sulfonic groups available for reaction with basic dyestuffs, per kilogram of the total composition.

27. The article of claim 26 in the form of a filament.

28. The article of claim 27 dyed with a basic dyestuff and characterized by color-fastness to fumes, light, washing, and ironing.

References Cited in the file of this patent

UNITED STATES PATENTS

| | | |
|---|---|---|
| 2,036,423 | Malm et al. | Apr. 7, 1936 |
| 2,168,348 | Izard | Aug. 8, 1939 |
| 2,601,256 | Bruson | June 24, 1952 |

UNITED STATES PATENT OFFICE
CERTIFICATE OF CORRECTION

Patent No. 2,849,330                          August 26, 1958

Henry A. Hoffman, Jr., et al.

It is hereby certified that error appears in the printed specification of the above numbered patent requiring correction and that the said Letters Patent should read as corrected below.

Column 3, line 54, for "FadelOmeter" read -- Fade-Ometer --; line 64, for "90° C." read -- 95° C. --; column 7, line 27, for the claim reference numeral "14" read -- 4 --; column 8, line 12, for "sulfoethyl" read -- sulfoethoxyethyl --.

Signed and sealed this 28th day of October 1958.

(SEAL)
Attest:

KARL H. AXLINE
Attesting Officer

ROBERT C. WATSON
Commissioner of Patents